Dec. 1, 1925.

S. R. BARTON

IMPRESSION TRAY

Filed March 25, 1921

1,563,955

Inventor
Samuel R. Barton,

Witness
William J. Russell

By Clifton C. Callowell
Attorney

Patented Dec. 1, 1925.

1,563,955

UNITED STATES PATENT OFFICE.

SAMUEL R. BARTON, OF PRINCE BAY, NEW YORK, ASSIGNOR TO THE S. S. WHITE DENTAL MANUFACTURING COMPANY, A CORPORATION OF PENNSYLVANIA.

IMPRESSION TRAY.

Application filed March 25, 1921. Serial No. 455,606.

*To all whom it may concern:*

Be it known that I, SAMUEL R. BARTON, a citizen of the United States, and a resident of Prince Bay, in the county of Richmond, State of New York, have invented certain new and useful Improvements in Impression Trays, of which the following is a specification, reference being had to the accompanying drawings.

My invention relates particularly to that class of impression trays that comprise a handle and bowl formed in unitary relation and adapted to carry plaster or other impression taking material by which the impression of the contour of the human mouth may be reproduced, and is especially directed to the method by which said impression tray may be produced.

The principal objects of my invention are to provide an impression tray that may be stamped from a blank of sheet metal, of a gauge adequate to withstand the stresses to which its handle may be subjected, and having the bowl thereof reduced in thickness and capable of being readily distorted by the fingers of the operator to conform to different desired contours.

Other objects of my invention are to provide a method by which the bowl of an impression tray may be reduced to a thickness relatively thinner than the handle portion without subjecting it to possible distortion incident to its being compressed by rolling or hammering.

The form of my invention as hereinafter described comprehends an impression tray which has its handle and bowl formed in unitary relation from a stamping of sheet metal of uniform gauge, and which has its bowl portion rendered relatively thinner than the handle portion by chemical dissolution.

My invention further includes all of the various novel features of construction and arrangement as hereinafter more definitely specified.

Figure 1:
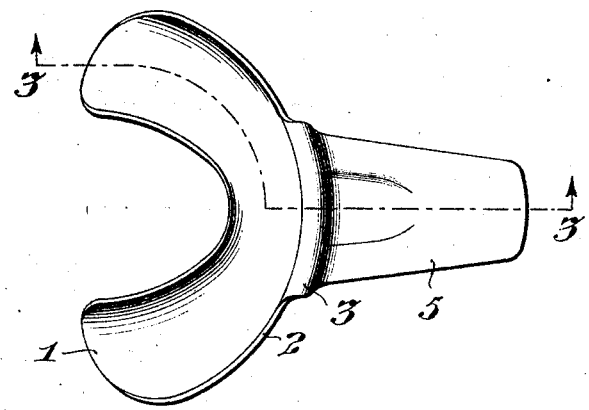
Figure 2:
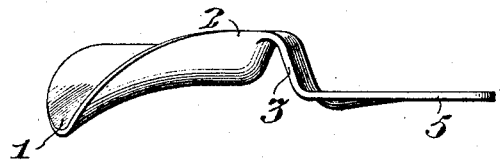
Figure 3:
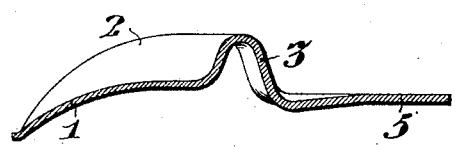
Figure 4:
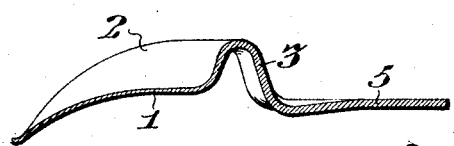

In the accompanying drawings, Figure 1 is a plan view of an impression tray, constructed in accordance with my invention, formed from a sheet metal stamping with its bowl and handle of the same thickness throughout; Fig. 2 is a side elevational view of the impression tray shown in Fig. 1; Fig. 3 is a vertical longitudinal sectional view taken on the line 3—3 in Fig. 1; Fig. 4 is a sectional view similar to the sectional view shown in Fig. 3, showing the bowl portion of the tray relatively thinner than the handle portion of said tray.

In said figures, the impression tray illustrated is of typical form and comprises the plaster-receiving bowl 1 which is of substantially semi-circular contour having its perimetral wall 2 upturned and provided at its medial region with a projection 3 extended downwardly and outwardly to form a handle 5 in unitary relation with said bowl, by which the tray may be conveniently manipulated.

Such an impression tray may be conveniently stamped from a sheet metal blank of aluminum, but it has been found impracticable to reduce the thickness of the bowl portion of an aluminum tray by the pressure method, possible with other metals.

I have found that by immersing the bowl portion of the tray shown in Figs. 1, 2, and 3 in a bath of caustic soda, the surface of the bowl is attacked thereby and dissolved to produce the relatively thinner bowl shown in Fig. 4.

The method which appears to be best suited for the purpose may be conveniently effected by dipping that portion of the tray to be reduced, into a boiling 10% solution of caustic soda until the thickness of the metal forming the bowl portion is reduced to the desired thickness. Said tray may then be completely submerged for a few seconds to produce a uniformly etched surface on the handle as well as on the bowl portion. The tray may be then washed in running water and dipped in concentrated nitric acid until the dark deposit left by the caustic solution has fully disappeared, after which said tray may again be washed in running water and dried.

My invention is advantageous, in that the process above set forth produces an impression tray having the metal of the bowl section so reduced in thickness as to render it pliable so that it may be bent by the fingers of the operator, while the handle section is of such gauge or thickness that it cannot be readily bent by normal use, and the tray as a whole is afforded a uniformly frosted or etched surface by the treatment of such process.

I do not desire to limit my invention to the precise details of construction, arrangement, and process as herein set forth as it is obvious that various modifications may be made therein without departing from the essential features of my invention as defined in the appended claims.

Having thus described my invention, I claim:—

1. A dental impression tray formed of a unitary blank of sheet material and comprising a pliant bowl of uniform thickness and a handle of relatively greater thickness and stiffness than said bowl.

2. The method of producing a dental impression tray having a bowl and handle formed of a stamping of metal of uniform thickness, which consists of immersing the bowl portion thereof in a solution of caustic soda until the thickness of said bowl is relatively thinner than said handle, and then immersing the handle to provide a uniformly etched surface.

In witness whereof, I have hereunto set my hand this 21st day of March, A. D. 1921.

SAMUEL R. BARTON.